No. 610,430. Patented Sept. 6, 1898.
C. G. COZINE.
CATTLE GUARD.
(Application filed May 23, 1898.)
(No Model.) 2 Sheets—Sheet 2.
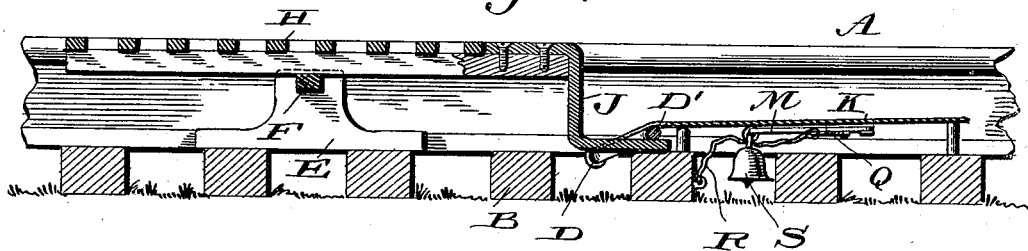
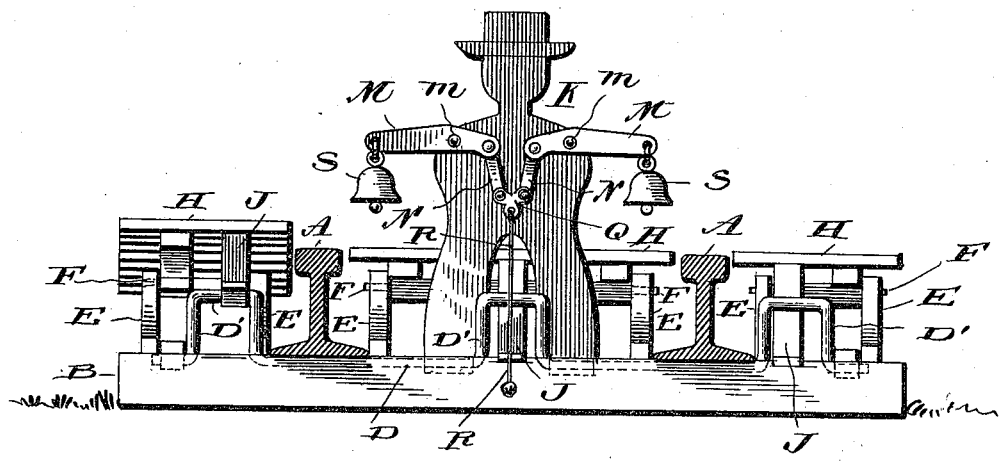

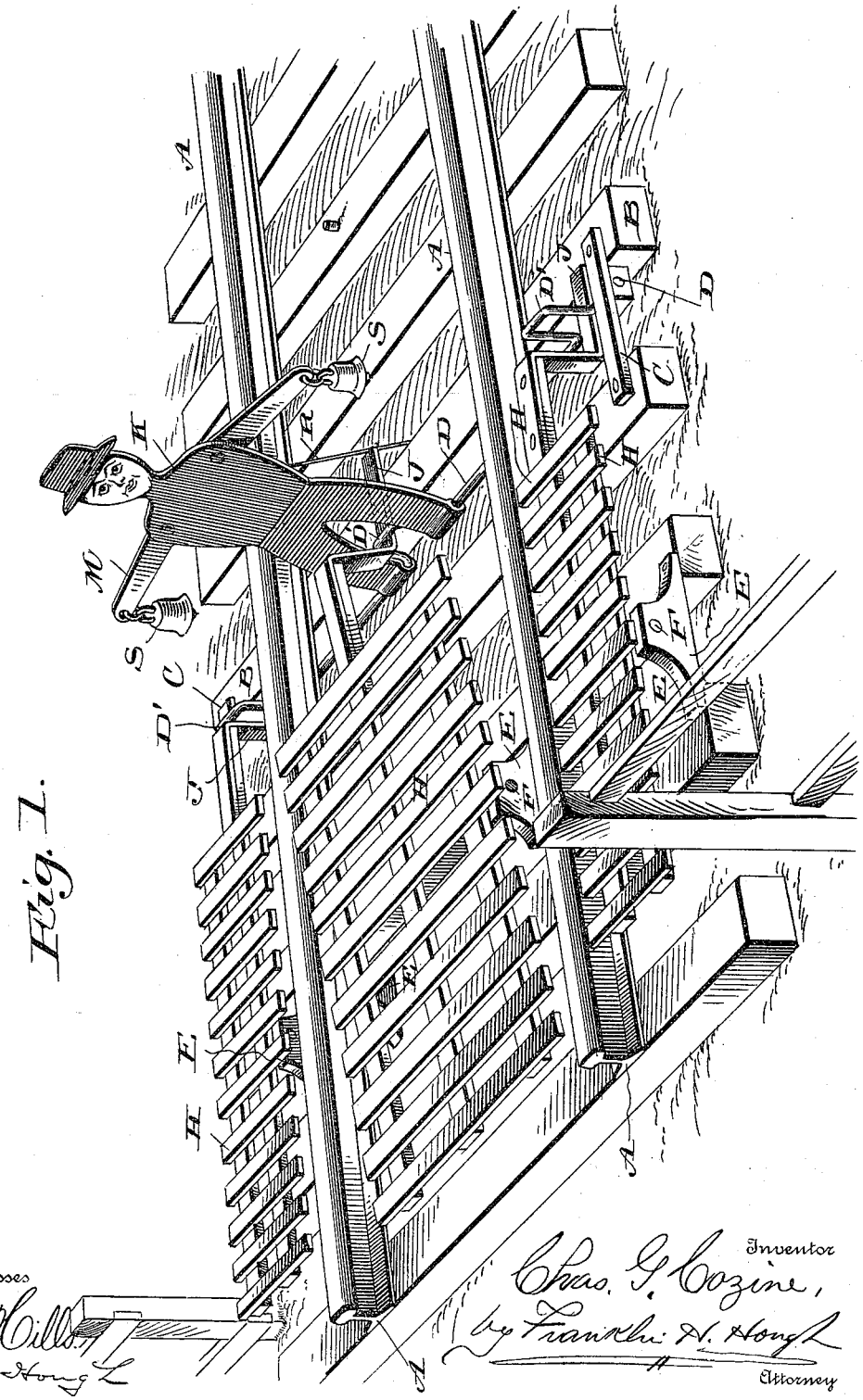

UNITED STATES PATENT OFFICE.

CHARLES G. COZINE, OF LAWRENCEBURG, KENTUCKY, ASSIGNOR OF TWO-THIRDS TO JAS. C. VANARSDELL, OF SAME PLACE, AND JOHN J. C. BOND, OF HARRODSBURG, KENTUCKY.

CATTLE-GUARD.

SPECIFICATION forming part of Letters Patent No. 610,430, dated September 6, 1898.

Application filed May 23, 1898. Serial No. 681,469. (No model.)

*To all whom it may concern:*

Be it known that I, CHARLES G. COZINE, a citizen of the United States, residing at Lawrenceburg, in the county of Anderson and State of Kentucky, have invented certain new and useful Improvements in Cattle-Guards; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in cattle-guards, and especially to a tilting platform or platforms arranged between and at the sides of the rails, which are adapted to actuate mechanism as they are tilted whereby a visual as well as an audible signal is made to any animal which may trespass upon the railway.

More specifically the present invention resides in the provision of tilting platforms that have angled projections designed as the platforms are tilted to engage in offsets in a rod journaled underneath the railway-rails, which rod has attached to one of its offsets, preferably the one between the rails, a figure, which is brought to nearly a perpendicular position as one of the platforms is tilted, thus presenting a visible signal to the intruding animal as it steps upon the platform, the said signal automatically returning to its starting position between the rails after the animal has stepped off the platform.

A further part of the invention consists in pivoting or otherwise suitably mounting arms upon the tilting or swinging figure secured to the offset in the rod journaled underneath the rails, which arms carry at their ends bells, which are rung by the said arms being caused to be thrown out from the figure as the latter is tilted or thrown up to a substantially vertical position, means being provided to return the arms carrying audible signals and the figure to a horizontal position between the rails automatically as the animal leaves the platform.

The present invention is clearly illustrated in the accompanying drawings, which, with the letters of reference marked thereon, form a part of this application, and in which drawings similar letters of reference indicate like parts throughout the several views, in which—

Figure 1 is a perspective view of the cattle-guard, showing the platform tilted and the signal raised. Fig. 2 is a central longitudinal section through the middle platform. Fig. 3 is a cross-section through the rear of the platform.

Reference now being had to the details of the drawings by letter, A designates the rails, and B the ties, of the railway. Secured to the ends of any of the ties are the strips C, in which are journaled the ends of the rod D, underneath the rails and between the ties. This rod has a plurality of offsets D', there being three shown in the drawings, one between the rails and one on each side of the track near the ends of the ties. At a suitable location with reference to the said rod are mounted the brackets E E, in which are journaled the shafts F, which carry the platforms H, which platforms are mounted near their middle portions, so as to tilt easily when any weight is placed upon their forward ends. These platforms may be of any suitable construction, those shown in the drawings being constructed of slats placed crosswise on parallel stringers. One of the said stringers is extended a short distance beyond the end of each platform, and to each extension is secured an angle-iron J, the lower forwardly-extending end of which rests normally on a tie or in a recessed portion thereon, as shown, and on each free end of an angle-iron rests an offset portion of rod D, so arranged that when an animal steps on the forward tilting end of one of the platforms the platform will tilt and the angle-iron secured thereto will engage underneath an offset portion of the rod and will raise the offset portion to a substantially vertical position, thus causing a partial revolution of the rod. To one of these offsets, preferably to the one located between the rails, is secured the figure K, which may have the outline of the body of a man, and which figure normally rests in a horizontal position until the platform is tilted, when the figure is automatically brought to nearly a vertical position, which is designed to startle an animal that trespasses upon the railway as it steps upon the platform and causes it to turn back.

In order to sound an alarm at the instant the figure is thrown to a vertical or upright position, I provide arms M, which are pivoted to the body of the figure at $m$. To the inner end of each of the said arms is pivoted a link N, each of which links is in turn pivoted to a yoke Q, as clearly illustrated. To this yoke is secured one end of the cable, chain, or link R, the other end of which cable is fastened at any suitable place, as to the side of a tie. To the free ends of the said arms are fastened the bells S, which are caused to be rung as the arms are thrown out at right angles to the body of the figure as the latter swings to an upright position. The said cable will draw the inner ends of the arms down, the latter tilting on their pivots, while their outer ends will fly up to a horizontal position, as will be readily understood. This cable is of such a length as to allow the figure to rise nearly to a vertical position, but tilting slightly away from the platforms, so that it will readily fall by gravity when the platform which has been tilted returns to its horizontal position.

From the foregoing it will be seen that both an audible and a visible signal are afforded, whereby animals may be warned off the track at night as well as in the daytime.

What I claim as new, and desire to secure by Letters Patent, is—

1. A cattle-guard for railways consisting of the tilting platform, a rod journaled beneath the rails, offsets in said rod, a figure secured to one of the offsets, and an angle-iron secured at one end to the platform, its other end resting under an offset, whereby as the platform is tilted, the figure is brought to an upright position, and allowed to fall by gravity, as set forth.

2. In combination with the tilting platform, the angle-iron secured thereto, the rod and figure mounted as set forth, the arms pivoted to the figure, bells carried by said arms, and means for throwing the arms out from the body of the figure as the latter is swung into an upright position.

3. In combination with the figure mounted as shown, and means for operating the same, the arms pivoted to the figure, the yoke and links pivoting the latter to the inner ends of the arms, and the cable connected at one end to the yoke, its other end to a fixed object, as set forth.

In testimony whereof I affix my signature in presence of two witnesses.

CHARLES G. COZINE.

Witnesses:
S. V. HAWKINS,
J. B. LONG.